Oct. 10, 1933.  C. R. SHORT ET AL  1,930,287
METHOD OF COMPRESSING POWDERED MATERIALS
Filed Dec. 21, 1927
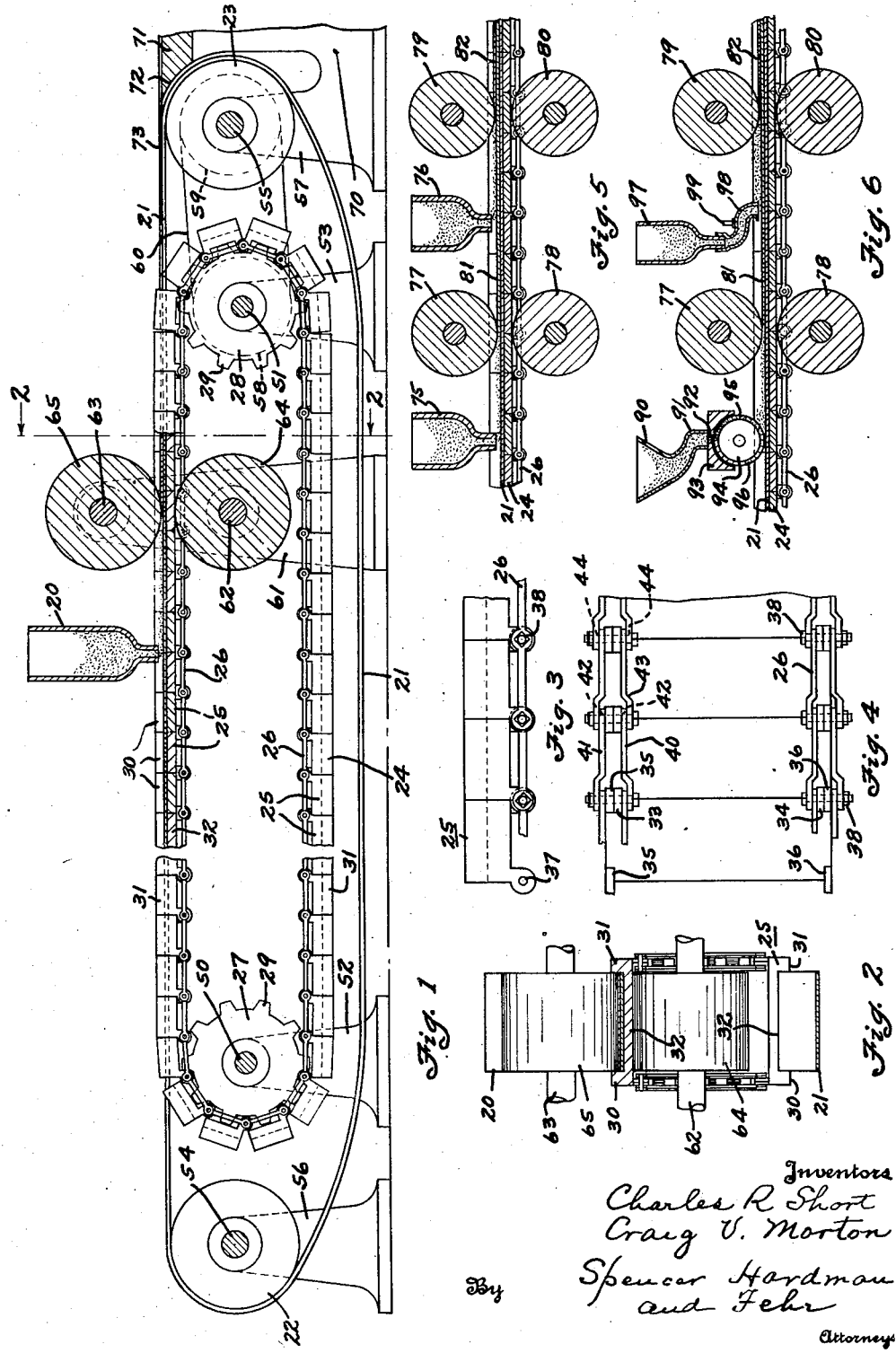

Patented Oct. 10, 1933

1,930,287

UNITED STATES PATENT OFFICE 1,930,287

METHOD OF COMPRESSING POWDERED MATERIALS

Charles R. Short, Detroit, Mich., and Craig V. Morton, Dayton, Ohio, assignors to The Moraine Products Company, Dayton, Ohio, a corporation of Ohio Application December 21, 1927
Serial No. 241,698

12 Claims. (Cl. 29—149.5)

This invention relates to porous metallic bodies adapted to be used in rubbing contact with other relatively movable bodies and particularly adapted to be used in bearings; and a method of making such bodies.

Heretofore in the manufacture of porous metallic bodies of this character the mixture of powdered metals and other materials employed in the making the said bodies has been briquetted in substantially the desired shape by a single pressing operation, which is repeated for the formation of each briquette, it being necessary to recharge the press with the mixture of materials used between each pressing operation. The briquettes thus formed are sintered in any desirable manner. A method of manufacture involving repeated operations of this character is necessarily an uneconomical one in the matter of time.

It is therefore the primary object of the present invention to devise a method of making porous metallic bodies of the character referred to in which the materials used in the manufacture of such bodies may be briquetted to compress said materials into a compact mass of desired structural formation at one continuous operation.

It is a further more specific object of the invention to devise a method of forming porous metallic bodies having a laminated structure comprising layers which may have different degrees of porosity, in which the mixture of materials used in making such bodies may be compressed continuously to form a body having the desired structural form at one continuous operation.

These objects are carried out according to the present invention, by rolling the materials while on a continuously moving conveyor. In forming a porous strip or body having the same degree of porosity throughout, measured increments of the materials employed are successively fed to the surface of a conveyor, which is operated continuously to carry the materials between two cooperating rollers, which are also operated continuously to subject the materials to the pressure necessary to form a body or strip of the desired thickness and density. After the rolling operation, the body or strip may be cut into whatever lengths are desired and sintered in the well known manner. When forming a body of laminated construction, the method is the same except for the fact that there are two rolling operations. The materials for forming one layer are rolled as above described, while the materials forming the second layer are deposited on the already formed first layer while the latter is still on the conveyor, and the first layer with the materials for the second layer spread thereon is passed between a second pair of rollers, which compress the materials forming the second layer.

Further objects and advantages of the present invention will be apparent from the following description, reference being had to the accompanying drawing, wherein a preferred form of embodiment of the present invention is clearly shown.

In the drawing:

Fig. 1 is a more or less diagrammatic view partly in section of a preferred form of apparatus for carrying out the present invention.

Fig. 2 is a fragmentary section on the line 2—2 of Fig. 1.

Fig. 3 is a side elevation showing a detail of a conveyor illustrated in Fig. 1.

Fig. 4 is a view of the structure shown in Fig. 3, looked at from below.

Figs. 5 and 6 are detail sectional views of two modified forms of the invention.

Referring to Fig. 1 of the drawing, the reference numeral 20 indicates a hopper which is adapted to be filled with the mixture of materials used to form a porous metallic structure having the same degree of porosity throughout. The specific materials employed form no part of this invention, a suitable mixture being described in the patent to H. M. Williams, No. 1,642,347. These materials are fed from the hopper to an endless conveyor 21, which during operation of the apparatus is moved continuously past the hopper 20 so that the materials fed from the hopper are deposited in a comparatively thin layer on said conveyor, the thickness of the layer depending in part on the speed at which the conveyor passes the hopper 20. The latter may be of any desired construction, the specific construction thereof being no part of this invention, and in Fig. 1 is shown merely a conventional form of hopper. The specific form of hopper disclosed in Fig. 1 of the application of Charles R. Short and Roland P. Koehring, Serial No. 231,410 filed Nov. 8, 1927, might be used with satisfactory results.

The conveyor 21 is a flexible strip of steel or other suitable metal which passes over rollers 22 and 23. These are rotated, during operation of the apparatus, in the manner hereinafter described, to move the endless conveyor 21. The conveyor 20 surrounds another conveyor indicated in its entirety by the reference numeral 24. The conveyor 24 comprises a plurality of articulated, rigid metal sections 25, supported by a sprocket chain 26, which passes over two driving sprocket wheels 27 and 28, having teeth 29 thereon engaging the links of the chain to move the conveyor continuously as the wheels 27 and 28 are operated.

The conveyor sections 25, comprise side walls 30 and 31 and a bottom wall 32 integral therewith. Projecting from the bottom wall of each section are four lugs, arranged in front and rear pairs, those of the front or right hand pair in Figs. 1, 3 and 4 being indicated by the reference numerals 33 and 34, while those of the rear or left hand pair are numbered 35 and 36. Each of said lugs is provided with a central orifice 37. It will be obvious that when the conveyor is assembled the forward or right hand lugs 33, 34 of one section lie immediately within the rear or left hand projections of the next adjacent section to the right, the orifices 37 in all the projections being in registry and a bolt 38 or other suitable connecting means is received in such orifices.

The sprocket chain 26 is composed of inner and outer links 40 and 41 respectively. The links 40 and 41 at the forward or right hand end thereof are provided with orifices 42 through which the bolt 38 extends when the device is assembled. The rear or left hand ends of links 40 and 41 are bent as indicated at 43 in Fig. 4 and are each provided with an orifice 44 adapted to receive the bolt 38, the forward ends or one pair of links 40, 41 being received between a pair of lugs 33, 35 or 34, 36 and the rear ends of the next adjacent pair of links, the bolt 38 extending through the whole assembly as indicated in Fig. 4.

It will be clear from this description that the various sections 25 of the conveyor are carried by the sprocket chain 26 and are pivoted on the bolts 38, so that as the chain passes over its driving wheels 27 and 28 the side walls of adjacent sections of the conveyor 24 separate as indicated in Fig. 1, but between the driving wheels, the side walls of adjacent sections 25 engage each other to form a continuous trough, in the bottom of which travels the metal strip 21 on which the materials fed from the hopper 20 are deposited. The engagement of the side walls of the various conveyor sections at their adjacent vertical ends prevents any material sagging of the upper part of the conveyor 24 between the sprocket wheels 27 and 28. If desired supporting guides may be provided under the portion of the conveyor, but such guides are not necessary and for the sake of simplicity of disclosure no such guides are shown herein.

The sprocket wheels 27, 28 are secured to shafts 50 and 51 respectively, said shafts being journalled for rotation respectively in standards 52 and 53. The shafts 50 and 51 may be driven from any suitable source of power, as for instance an electric motor, which may be connected in driving relation to either one of such shafts. The specific driving means forms no part of this invention.

The rollers 22 and 23 which operate the flexible conveyor 21 are fixed on shafts 54 and 55 respectively, the latter being journalled respectively in standards 56 and 57. The flexible conveyor is driven from the driving means for the articulated conveyor by means of a pulley 58 secured to shaft 51, and a pulley 59 fixed on shaft 55, a belt 60 passing around the two pulleys. The two pulleys must be of such size that the two conveyors are driven at the same speed in order to secure the best results. The above described driving means is a mere conventional form of driving connection, and any suitable form of driving means which would effect movement of the two conveyors at the same speed could be used.

Positioned between the hopper 20 and the sprocket wheel 28 are upright standards 61, in which are journalled two shafts 62 and 63 on which are fixed rollers 64 and 65 respectively. The rollers are positioned on opposite sides of the conveyors and the shafts 62 and 63 are at such a distance from the conveyors that the roller 64 engages the under-side of the bottom of the articulated conveyor, while the roller 65 projects into the trough formed by the vertical walls thereof to a point very close to the upper side of said bottom wall. The distance between the roller and the surface of the conveyor 21 would depend on the thickness of the layer of materials deposited on said conveyor, and should be such that said materials as they pass under the roller are subjected to a pressure of approximately 60,000 to 75,000 lbs. per square inch. The shaft 63 or roller 65 may be removably mounted, in any conventional manner so as to permit removal of a roller and substitution of one of different size if it be desired to form a porous metallic strip of greater or less thickness. The shafts 62 and 63 may be driven by any suitable driving means, which is not illustrated, since the specific form of driving means forms no part of this invention. Instead of being removably mounted, the roller 65 may be mounted in the standards 61 so as to be vertically adjustable.

The standard 57 is cast integral with a support 70 for a table 71, the edge 72 of which is positioned closely adjacent the conveyor 21 as it passes over the roller 23 so that the porous metallic strip formed as the materials issuing from the hopper 20 are carried under the roller 65, will be deposited on the table 71 as it leaves the conveyor 21.

The standards 52, 53, 56, 57 and 60 are, of course, arranged in pairs, only one of each pair being shown in Fig. 1.

In operation of the above described device, the hopper 20 is filled with powdered materials such as referred to in the above mentioned patent to Williams. The driving means for the conveyors 21 and 24 is started into operation and as the conveyors are moved to the right in Fig. 1 the materials are fed from the hopper to the surface of the conveyor 21, forming a layer of the desired thickness of said conveyor. The conveyor 21 carries these materials between the rollers 64 and 65, where the materials are subjected to the necessary pressure to form said materials into a metallic structure of the desired degree of porosity. The metallic structure formed by the rollers is a long strip 73, and if the hopper is constantly refilled before becoming empty and the conveyors and rollers operated continuously, the strip 73 may be made in any desired length. The conveyor 21 feeds the strip to the table 71 where it may be cut off by any suitable cutting means into such lengths as may be desired for any particular purpose. The strip 73 may be of any desired width, depending on the width of the conveyors and cooperating rollers.

The modified construction illustrated in Fig. 5 is adapted to form a metallic strip having layers which differ in porosity, such as described in copending application Serial No. 221,341 filed September 22, 1927, Patent No. 1,834,746. This device does not differ from that disclosed in Fig. 1 in the construction of the conveyors and table to receive the formed metallic strip, but instead of a single hopper 20, two hoppers 75 and 76 are provided and two pairs of pressure rollers 77, 78 and 79, 80 are employed instead of the single pair of rollers 64, 65. The two pairs of rollers are adapted to be supported in two pairs of standards similar to the standard 61. The rollers 77, 78 are positioned to the right of the hopper 75, while rollers 79 and 80 are positioned to the right of hopper 76. No driving means for the rollers is shown, but any conventional driving means which will operate all the rollers at the same speed can be employed.

In this form of apparatus the hopper 75 is adapted to be filled with the powdered materials referred to in application No. 221,341, such as copper powder or copper tin powder, which is fed from said hopper in the manner previously described, to the upper surface of the conveyor 21, forming a layer thereon of the desired thickness. As the conveyor 21 moves to the right as in Fig. 1 this layer of copper powder is carried under the roller 77 and sufficiently compressed to be formed into a thin layer of relatively slight porosity indicated at 81 in Fig. 5. As this strip is carried on by the conveyor 21 beyond the rollers 77, 78 it passes under hopper 76, which is filled with the materials previously referred to in the description of the form of the invention shown in Fig. 1. These materials are fed from hopper 76 to the surface of the copper strip formed by the rollers 77, 78, forming a relatively thin layer thereon, and said strip with its layer of powdered materials is carried by the conveyor under roller 79, where such materials are compressed to form a layer of porous metallic structure indicated at 82 in Fig. 5. The pressure to which the materials are subjected by the pressure rollers is so great that the two layers 81 and 82 are joined together to form what is a substantially integral structure having one layer 81 which has but little porosity and another layer 82 which is porous to a much greater degree. These two layers may be of any relative thickness desired, but in general it is desirable that the more porous layer 82 be of considerably greater thickness than the layer 81. This result could be accomplished by a number of different devices, but a simple and convenient device for the purpose is shown in Fig. 5. To this end the outlet of the hopper 75 is of considerably less cross sectional area than the outlet of hopper 76, so that a greater quantity of material is fed from the hopper 76 per unit of time than from the hopper 75. By varying the sizes of the hopper outlets, layers of any relative thickness may be obtained.

The modified construction shown in Fig. 6 is also adapted to form a metallic structure comprising a plurality of layers, one of which is more porous than the other. In this form of the apparatus a device is provided to effect a more accurate measuring and substantially even distribution of the copper powder used to form the less porous layer of substantially pure metallic copper. It is desirable to deposit the materials forming the less porous strata on the conveyor in a layer of as nearly even thickness as possible because this layer is generally quite thin, and even comparatively slight variations in the amount of copper powder deposited on different portions of the conveyor would make a great difference in the total thickness of the less porous layer at different points throughout the metallic strip formed. This would result in a strip of very uneven strength since the layer of metallic copper has much greater tensile strength than the more porous layer.

To secure substantially even distribution of the material referred to there is provided, as shown in Fig. 6, a hopper 90 having a discharge neck 91 communicating with a slot 92 formed in a shield 93 supported in any suitable manner immediately above a measuring and distributing member 94 which is positioned above conveyor 21. The latter is rotatably mounted in any suitable manner and is provided at its periphery with parallel, radially projecting blades 95, which form a plurality of measuring troughs 96 between adjacent blades. The member 94 is adapted to be rotated by any suitable means and as said member rotates the troughs 96 are successively filled with the powdered material as they pass beneath the slot 92 which is deposited in measured increments, successively, on the surface of the conveyor 21 as said conveyor is moved to the right beneath the member 94. By varying the speed of rotation of the member 94 relative to the speed of the conveyor 21, the amount of material deposited on any given length of the conveyor may be varied, to vary accordingly the thickness of the less porous layer 81 of the porous metallic structure.

While the above described device for depositing a layer of powdered materials which is substantially even in thickness is particularly useful in the formation of the thinner and less porous layer of a structure having layers which differ in porosity, it may be used with equal success to secure more even distribution of the materials forming the more porous layer of said structure, or to deposit the materials for forming a structure of the same porosity throughout.

The conveyors 21 and 24 are operated in this form of the invention in the same way as in the embodiment shown in Fig. 1, the material deposited by the member 94 on the conveyor 21 being carried by the conveyor 21 between rollers 77 and 78, which compress said materials to form a layer 81. Positioned to the right of the rollers 77, 78 is a hopper 97 adapted to be filled with the powdered materials forming the less porous layer 82. This hopper communicates with a flexible discharge outlet pipe 98 provided with an upstanding pin 99 to which may be connected any conventional means for shaking the pipe 98. This form of outlet is provided to facilitate delivery of the materials from hopper 97 and prevent the possibility of clogging the outlet from said hopper. The materials delivered from said hopper are carried between rollers 79 and 80 to form the layer 82 and simultaneously form a single integral structure of the two layers 81 and 82 as previously described.

While the form of embodiment of the present invention as herein disclosed, constitutes a preferred form, it is to be understood that other forms might be adopted, all coming within the scope of the claims which follow.

What is claimed is as follows:

1. The method of making porous metallic bodies which consists in feeding powdered materials to a conveyor, operating the conveyor continuously to carry said materials progressively into position to be compressed, applying pressure to said materials continuously to form a sheet of desired structural formation and thickness, and sintering the sheet so formed.

2. The method of making porous metallic bodies from powdered materials which includes the steps of depositing said materials in a layer of substantially even thickness on a movable conveyor and operating the conveyor continuously to carry said materials between pressure rollers to form a sheet of desirable structural formation and thickness.

3. The method of making porous metallic bodies which consists in continuously feeding powdered materials to a conveyor, operating the conveyor continuously to carry said materials progressively into position to be compressed, applying pressure to said materials continuously to form a sheet of desired structural formation and thickness, and sintering the sheet so formed.

4. The method of making porous metallic bodies from powdered materials which includes the steps of feeding such materials to a conveyor and applying pressure continuously and progressively to said materials while on the conveyor.

5. The method of making porous metallic bodies from powdered materials which includes the steps of successively feeding measured quantities of said materials to a conveyor and applying pressure continuously and progressively to the materials while on the conveyor.

6. The method of making porous metallic bodies from powdered materials which includes the steps of successively feeding measured quantities of said materials to a conveyor, operating said conveyor to bring the powdered materials in position to be compressed by a presser element and operating said element to apply pressure to said materials continuously.

7. The method of making porous metallic bodies from powdered materials which includes the steps of feeding such materials to a conveyor, applying pressure to the materials while on the conveyor to form a porous metallic sheet, feeding powdered materials to the surface of said sheet and applying pressure to said materials.

8. The method of making porous metallic bodies from powdered materials which includes the steps of continuously and progressively applying pressure to a part of such powdered materials to form a porous metallic sheet, feeding a part of such materials to the surface of said metallic sheet and continuously and progressively applying pressure to such materials while on the sheet.

9. The method of forming porous metallic bodies from powdered materials which includes the steps of successively feeding measured quantities of part of the materials used to a supporting surface, to form an even layer thereon, applying pressure progressively and continuously to these materials to form a porous metallic sheet, feeding another part of the materials to the surface of such sheet and applying pressure progressively and continuously to such materials while on said metallic sheet.

10. The method of forming porous metallic bodies having layers of different degrees of porosity from powdered materials which includes the steps of applying pressure continuously and progressively to the materials used in the formation of one layer, applying the materials to form another layer on the layer first formed and applying pressure continuously and progressively thereto.

11. The method of forming porous metallic bodies having layers of different degrees of porosity from powdered materials which includes the steps of successively feeding measured quantities of the materials forming one layer to a supporting surface, applying pressure continuously and progressively to said materials, feeding the materials to form another layer to the surface of the first formed layer and applying pressure continuously and progressively thereto.

12. The method of forming porous metallic bodies having layers of different degrees of porosity from powdered materials which consists in successively feeding measured quantities of the materials forming the less porous layer to a supporting surface, applying pressure continuously and progressively to these materials, feeding the materials forming the more porous layer to the surface of the first formed layer and applying pressure continuously and progressively thereto.

CHARLES R. SHORT.
CRAIG V. MORTON.